J. B. Hunter,

Gang Plow.

No. 96,593.  Patented Nov. 9, 1869.

Witnesses:
Wm. F. Clark.
Alex F. Roberts

Inventor:
J. B. Hunter
per
[signature]
Attorneys.

United States Patent Office.

JAMES B. HUNTER, OF ASHLEY, ILLINOIS.

Letters Patent No. 96,593, dated November 9, 1869.

IMPROVEMENT IN GANG-PLOWS.

The Schedule referred to in these Letters Patent and making part of the same.

*To all whom it may concern:*

Be it known that I, JAMES B. HUNTER, of Ashley, in the county of Jefferson, and State of Illinois, have invented a new and useful Improvement in Gang-Plows; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

My invention has for its object to furnish an improved gang-plow, simple in construction, effective in operation, and easily adjusted for larger or smaller plows, as the character of the plowing may require; and It consists in the construction and combination of various parts of the machine, as hereinafter more fully described.

A are the wheels, which revolve upon the journals of the axle B.

C is an iron frame-work, the rear end of which slides upon the axle B, and is secured to said axle when adjusted by set-screws, the points of which enter depressions in the under side of the axle B.

Figure 1:
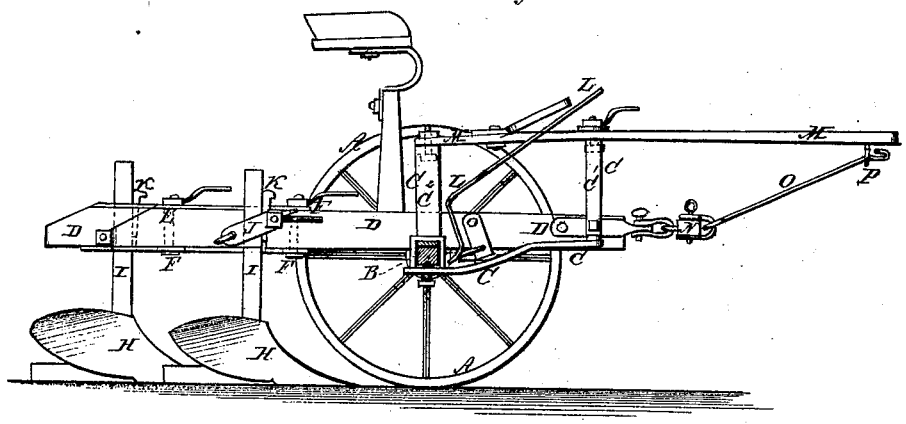
Figure 1 is a side view of my improved gang-plow, partly in section, through the line $x$ $x$, fig. 2.

Upon the forward end of the frame C is formed, or to it is rigidly attached, an upwardly-projecting loop or keeper, $c^1$, in the lower part of which the forward end of the long or main plow-beam D is secured by a bolt, as shown in fig. 1.

To the rear part of the frame C is secured another rearwardly upwardly-projecting loop or keeper, $c^2$, through which the plow-beam D also passes, and within which it moves up and down freely.

E is the short or adjustable plow-beam, which is secured to the beam D by means of the four bars or plates F, the ends of which are securely bolted to the beam D.

The other ends of the plates F are slotted, and are secured to the beam E by bolts and hand-nuts, so that the beams D and E may be conveniently secured to each other at any desired distance apart, according to the size of the plows to be used.

Figure 2:
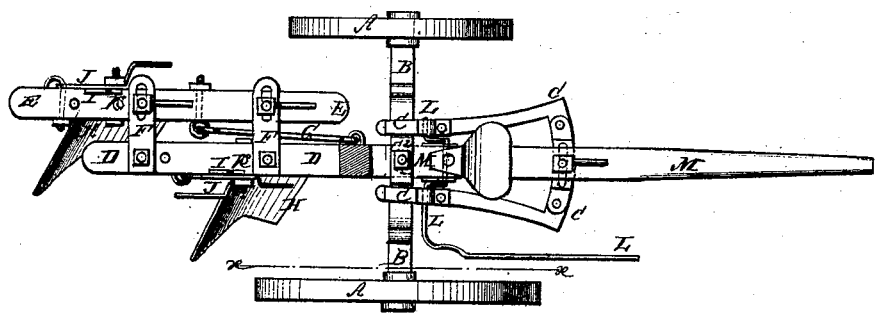
Figure 2 is a top or plan view of the same.

The draught-strain upon the beam E is supported by the draught-rod G, the forward end of which is pivoted to the side of the beam D, and the other or rear end of which is pivoted to the adjacent side of the beam E, as shown in fig. 2.

H are the plows, the standards, I, of which are let into notches in the outer sides of the beams D and E, where they are secured in place by the straps or hasps J, one end of which is pivoted to the said beams, and their other ends are secured by bolts and hand-nuts, as shown in figs. 1 and 2. The standards I are further tightened in their places by the keys K, as shown.

The plows are raised from the ground, when required, by the bent lever L, which is pivoted to the rear part of the frame C, and the upper end of which extends up into such a position that it may be conveniently reached and operated by the driver from his seat.

The lower part of the lever L is bent four times at right angles, or has a crank formed in it, which passes through a strap, loop, keeper, or plates, the upper part of which is attached or pivoted to the beam D, so that by operating the lever L, the plows may be raised from the ground, when required.

M is the tongue, the rear end of which is secured to the top of the loop $c^2$ by a bolt and nut. The tongue M is also secured to the top of the loop $c^1$ by a bolt and hand-nut, said bolt passing through the said tongue and through a slot in the top of the said loop $c^2$, to enable the position of the tongue to be adjusted, as required, with reference to the line of draught.

N is the double-tree, which is connected at its centre with the forward end of the beam D by a staple and clevis or clevises, in the ordinary manner.

O is the draught-rod for the forward team, the rear end of which is connected with the centre of the double-tree N by a clevis, or other well-known means.

The rod O passes through the staple or guide-ring P, attached to the lower side of the forward part of the tongue M, and has a hook formed upon its forward end, for the convenient attachment of the forward horse or horses.

Having thus described my invention,

I claim as new, and desire to secure by Letters Patent—

1. The slotted plates F and draught-rod G, in combination with the plow-beams D E, substantially as herein shown and described, and for the purpose set forth.

2. The adjustable frame C $c^1$ $c^2$, in combination with the axle B, plow-beam D, and tongue M, substantially as herein shown and described, and for the purpose set forth.

3. The combination of the bent crank-lever L with the frame C and plow-beam D, substantially as herein shown and described, and for the purpose set forth.

4. The combination of the draught-rod O with the tongue M, double-tree N, and plow-beam D, substantially in the manner herein set forth and described.

JAMES B. HUNTER.

Witnesses:
SAMUEL HUNTER,
THOMAS WITSON.